UNITED STATES PATENT OFFICE.

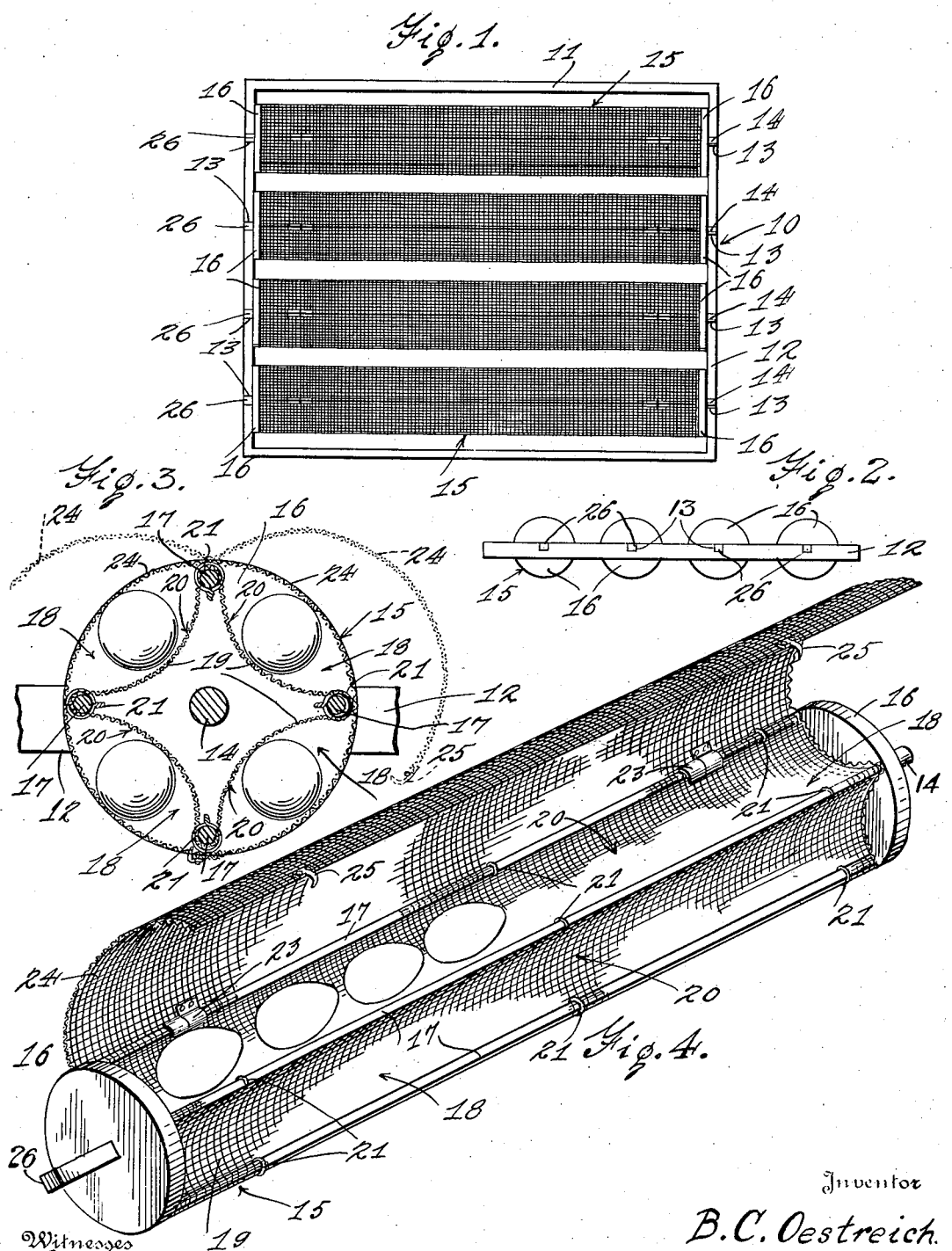

BENJAMIN C. OESTREICH, OF BELLINGHAM, MINNESOTA.

COMBINED EGG TRAY AND TURNER.

1,166,626.  Specification of Letters Patent.  Patented Jan. 4, 1916.

Application filed May 28, 1915. Serial No. 31,042.

*To all whom it may concern:*

Be it known that I, BENJAMIN C. OESTREICH, a citizen of the United States, residing at Bellingham, in the county of Lac qui Parle, State of Minnesota, have invented certain new and useful Improvements in Combined Egg Trays and Turners; and I do hereby declare the following to be a full, clear, and exact description of the invention, such as will enable others skilled in the art to which it appertains to make and use the same.

This invention relates to incubator appliances and is directed more particularly to a combined egg tray and turner of simple and inexpensive construction.

An object of the invention resides in the provision of an egg tray adapted to be removably supported within the incubator in the usual manner and embodying a plurality of novelly constructed egg receiving cylinders that may be readily manipulated to turn the eggs during progress of a hatch.

With the above and other objects of similar nature in view, the invention consists in the construction, combination and arrangement of parts, set forth in and falling within the scope of the appended claim.

In the drawing:—Figure 1 is a top plan view of an egg tray embodying the invention, Fig. 2 is a side elevation thereof, Fig. 3 is an enlarged cross sectional view through one of the egg receiving cylinders, and Fig. 4 is a perspective view of a cylinder partially filled with eggs.

Referring now more particularly to the drawing, the tray is shown as comprising a rectangular frame 10, including side and end members 12 and 11 respectively, the former being provided in their upper faces with spaced notches 13 corresponding pairs of which are adapted to receive and support the shafts 14 of a plurality of cylindrical egg receiving containers 15.

In describing in detail the containers 15 there are fixed adjacent the ends of the shafts 14, circular blocks or disks 16, said disks forming the end of the containers and being suitably connected at spaced intervals by relatively stiff wires or rods 17. To provide the egg receiving spaces 18 in each of the containers, a continuous strip 19 of reticulated material is passed outwardly of the rods 17 with those portions intermediate the rods pressed inwardly as indicated as 20. Each of the strips where it contacts with the rods 17 is suitably secured as at 21 and its meeting edges are likewise fastened together.

Hingedly connected as at 23 to one of the rods 17, are semi-cylindrical closure members 24, said members being also formed of reticulated material and adapted to inclose the egg receiving spaces 18 whereby to retain the eggs therein. To secure the members 24 in closed position suitable fasteners 25 are provided which may be readily engaged with or disengaged from the adjacent rod 17 as desired.

It will be noted in Fig. 3 of the drawing that when eggs are placed within the spaces 18 provided for the purpose and the members 24 closed and secured in position, said eggs are firmly held between the members 24 and strips 19, and possibility of breakage during the turning operation thus eliminated. It will also be noted that one end of each of the shafts 14 is squared as indicated at 26, and the corresponding notches 13 likewise squared to receive said ends. The containers 15 are in this manner held against rotation, but when it is desired to turn the eggs, the squared ends 26 may be lifted from their notches and the containers readily rotated a quarter or half turn as desired, after which the ends 26 are again engaged in the notches.

As it is not necessary after the 18th day of incubation to turn the eggs, same may be at that time removed from the containers and placed upon the ordinary trays to hatch.

What is claimed, is:—

In a combined egg tray and turner, a frame, a plurality of cylindrical containers mounted to turn within the frame, said containers each comprising a shaft, disks fixed adjacent the ends of the shafts, rods connecting said disks, a continuous strip of reticulated material passed about and secured to said rods, with those portions between the rods pressed inwardly to provide egg receiving spaces, and semi-cylindrical closure members of reticulated material hinged to inclose said egg receiving spaces and firmly hold the eggs in position therein.

In testimony whereof, I affix my signature, in the presence of two witnesses.

BENJAMIN C. OESTREICH.

Witnesses:
LEOPOLD RADKE,
MIKE BURY.